United States Patent
Bloch

(10) Patent No.: US 6,677,806 B2
(45) Date of Patent: Jan. 13, 2004

(54) CHARGE PUMP FOR GENERATING HIGH VOLTAGES FOR SEMICONDUCTOR CIRCUITS

(75) Inventor: Martin Bloch, Gröbenzell (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/141,844

(22) Filed: May 9, 2002

(65) Prior Publication Data

US 2002/0190780 A1 Dec. 19, 2002

Related U.S. Application Data

(63) Continuation of application No. PCT/DE00/03874, filed on Nov. 3, 2000.

(30) Foreign Application Priority Data

Nov. 9, 1999 (DE) .......................... 199 53 882

(51) Int. Cl.[7] .................................................. G05F 3/02
(52) U.S. Cl. ...................................................... 327/536
(58) Field of Search .............................. 327/536, 537; 365/59

(56) References Cited

U.S. PATENT DOCUMENTS

| 5,335,200 | A | * | 8/1994 | Coffman et al. ............ 365/218 |
| 5,912,560 | A | | 6/1999 | Pasternak ..................... 327/536 |
| 5,920,225 | A | | 7/1999 | Choi et al. ................... 327/536 |
| 5,933,047 | A | * | 8/1999 | Zhu et al. .................... 327/534 |
| 6,130,574 | A | * | 10/2000 | Bloch et al. ................. 327/536 |
| 6,172,886 | B1 | * | 1/2001 | Lauterbach et al. .......... 363/60 |
| 6,198,342 | B1 | * | 3/2001 | Kawai .......................... 327/536 |
| 6,278,315 | B1 | * | 8/2001 | Kim ............................. 327/536 |
| 6,292,048 | B1 | * | 9/2001 | Li ................................ 327/536 |
| 6,359,501 | B2 | * | 3/2002 | Lin et al. ..................... 327/536 |

FOREIGN PATENT DOCUMENTS

| DE | 195 05 502 A1 | 10/1995 |
| EP | 0 319 063 A2 | 6/1989 |
| WO | WO 98/33264 | 7/1998 |

* cited by examiner

Primary Examiner—Terry D. Cunningham
(74) Attorney, Agent, or Firm—Laurence A. Greenberg; Werner H. Stemer; Gregory L. Mayback

(57) ABSTRACT

The charge pump generates high voltages for integrated semiconductor circuits. The charge pump has a plurality of pump stages with at least one power transistor each for generating a pump voltage on a power path. The power transistor has a freely switchable bulk terminal with which a well structure of the power transistor can be maintained at a predetermined potential via a well charge path that is substantially separate from the power path.

6 Claims, 6 Drawing Sheets

CHARGE PUMP FOR GENERATING HIGH VOLTAGES FOR SEMICONDUCTOR CIRCUITS

CROSS REFERENCE TO RELATED APPLICATION

This application is a continuation of copending International Application No. PCT/DE00/03874, filed Nov. 3, 2000, which designated the United States and which was not published in English.

BACKGROUND OF THE INVENTION

FIELD OF THE INVENTION

The invention relates to a charge pump for generating high voltages for integrated semiconductor circuits, having a plurality of pump stages each having at least one power transistor for generating a pump voltage on a power path. The power transistor has a freely connectable bulk terminal, with which a well structure of the power transistor can be held at a predetermined potential via a well charging path that is substantially separate from the power path. In order to generate the predetermined potential, a first and a second well charging transistor are switched into the well charging path. The well charging transistors are connected in series, their junction point being connected to the bulk terminal of the power transistor and the outer terminals of the series circuit being connected in parallel with the outputs of the power transistor. A pump capacitor is connected between two pump stages in each case.

In the context of this description, the term "high voltages" refers to voltages whose magnitude is greater than a positive and/or negative supply voltage Vdd/Vss that is present at the relevant integrated semiconductor circuit. Such high positive and also negative voltages are required in most modern semiconductor circuits. This relates, in particular, to those circuits which comprise memories such as, for example, EEPROMs, DRAMs, FRAMs, etc. Furthermore, specific applications such as e.g. contactless systems such as mobile phones, chip cards, smartcards or wire-free devices appertaining to medical technology lead to ever smaller designs (0.25 $\mu$m, 0.18 $\mu$m) in the semiconductor technology of the integrated circuits, so that it is necessary also to reduce the supply voltages further and further (2.5 volts, 1.8 volts, 1 volt) and, consequently, charge pumps are required which must be evermore powerful in order to generate the high voltages mentioned in the introduction. Since the applications are generally battery-operated, it is desirable, moreover, for the total energy consumption to be kept as low as possible in order to enable a long operating duration.

In a semiconductor process, the basic elements are constructed from p- and n-doped regions with different doping, thereby producing a number of pn junctions and pnp and npn transistors. In a standard application, generally only positive voltages with a maximum level of Vdd and negative voltages with a minimum level of Vss are used with the basic elements (PMOS, NMOS, R, C), the standard situation being that the n-type well of the PMOS transistors is connected to Vdd and the p-type well of the NMOS transistors is connected to Vss. Consequently, in accordance with the specification, the pn junctions are expediently always reverse-biased and the pnp and npn transistors are always in the off state. However, as soon as voltages which differ from the voltages Vdd and Vss are required, special circuit concepts are necessary in order, with the basic elements then no longer connected up in a specification-forming manner, to keep the pn junctions and the pnp and npn transistors turned off. Thus, in an n-type well process, for example, the n-type well, which contains at least one p-doped channel of a PMOS transistor, is not permitted to be charged negatively since the n-type well/p-type substrate junction constitutes a forward-biased pn diode. Correspondingly, the well potential is not permitted to become lower than the voltage potential at a contact set into the well (positive base-emitter voltage, pnp transistor, p+-type contact/n-type well/p-type substrate).

Firstly, two prior art charge pumps which have been used previously in attempts to avoid these problems will be explained with reference to FIGS. 5 to 8. FIG. 5 shows the circuit of a charge pump for negative output voltages, while FIG. 7 illustrates a corresponding circuit for positive output voltages. FIGS. 6 and 8 in each case show a timing scheme for the driving of the circuit in accordance with FIG. 5 and FIG. 7, respectively.

The circuits are each composed of N+1 pump stages x which are connected in a series and together form a power path. A supply voltage Vdd is present at the input of the circuit, from which supply voltage the pump voltage Vpmp is generated, which charges a charging capacitor Cload at the output of the charge pump. In this case, the switching elements of a pump stage x are respectively designated by the same second index x.

The charge transport to the load capacitor Cload is effected via a plurality of power transistors M1x and pump capacitors Cpx in each pump stage x, which are alternately turned on and turned off and alternately charge and discharge the pump capacitors. For the driving of a power transistor M1x, each pump stage x furthermore has a control transistor M2x and a boost capacitor Cbx, which form a control circuit. An external clock generator (not illustrated) feds to those terminals of the pump and boost capacitors which are designated by F1 to F4 in FIGS. 5 and 7. The clock signals, in each case designated identically, in accordance with FIGS. 6 and 8, respectively. These illustrations are intended only to make it clear at what instance signals with a high or low level are present at the individual capacitors Cbx, Cpx of two successive pump stages.

In detail, during a first clock phase t1, a clock signal with a low level is present at the pump capacitor Cp2 of the second stage and the boost capacitor Cb1 of the first stage, and a clock signal with a high level is present at the pump capacitor Cp1 of the first stage and the boost capacitor Cb2 of the second stage.

In this case, the power transistor M11 of the first stage carries the required charge, while the control transistor M21 of the first stage serves for precharging the gate of the power transistor during the first clock phase t1.

During a second clock phase t2, wherein a clock signal with a low level is fed to the pump capacitor Cp1 of the first stage and to the boost capacitor Cb2 of the second stage and a clock signal with a high level is present at the pump capacitor Cp2 of the second stage and the boost capacitor Cb1 of the first stage, the control transistor M21 of the first stage is closed, and the potential at the gate of the power transistor M11 is reduced by at most the supply voltage Vdd by means of a boost pulse at the boost capacitor Cb1. As a result, the power transistor M11 opens particularly well, and the voltage drop across this transistor M11 can be minimized.

However, a first problem here is that this mechanism operates reliably only for as long as, in the first clock phase, the gate-source voltage (Vgs voltage) of the control transistor M21 (which corresponds to the drain-source voltage across the power transistor M11) is greater than the threshold voltage of the PMOS transistors used therefor. If the Vgs voltage is less than the threshold voltage of the PMOS transistors, then the gate of the power transistor M11 is no longer precharged, so that the transistor M11 does not remain in the on state and the pump fails.

A second problem arises when the pump is spontaneously discharged to zero volts by a discharging element at the output of the circuit. This is because charges then remain on the gates of the power transistors M1x, and cause a relatively high negative or positive potential there. The consequence of this is that all the power transistors M1x are greatly turned on and connect the input of the pump circuit to its output. If the supply voltage is too low, after the pump has been switched on again, the charges on the gates of the power transistors can no longer be removed. This means that the short circuit between the input and the output of the charge pump is maintained and the pump can no longer run up.

Finally, a third problem occurs by virtue of the fact that the NMOS or PMOS transistors, with their bulk terminal (p-type or n-type well), must be kept at zero volts or be per se at zero volts, in order that the well-substrate pn junction is not turned on. This implies a rising substrate control factor with rising positive or negative potential at the transistors. In detail, this means that the threshold voltage arises, to be precise to a greater extent in a p-type well process than in an n-type well process. As a result, the output voltage is limited by the last transistor in the chain (at the output, i.e. maximum potential) in a manner dependent on the temperature and the technology used.

SUMMARY OF THE INVENTION

It is accordingly an object of the invention to provide a charge pump for generating high voltages for semiconductor circuits, which overcomes the above-mentioned disadvantages of the heretofore-known devices and methods of this general type and wherein the three above-mentioned problems essentially do not occur, i.e. with which a reliable pump operation for generating relatively high output voltages is possible even at low operating voltages.

With the foregoing and other objects in view there is provided, in accordance with the invention, a charge pump for generating high voltages for integrated semiconductor circuits, comprising:

a plurality of pump stages and a pump capacitor connected between respective pump stages;

each of the pump stages having at least one power transistor for generating a pump voltage on a power path thereof, the power transistor having a well structure, a well charging path substantially separate from the power path, and a freely connectable bulk terminal via which the well structure can be held at a predetermined potential through the well charging path;

first and second well charging transistors connected into the well charging path for generating the predetermined potential;

the well charging transistors forming a series circuit having a node connected to the bulk terminal of the power transistor and outer terminals connected in parallel with the power transistor; and first and second boost capacitors connected to receive clock signals for controlling the charge pump, the first and second well charging transistors each having a control terminal respectively connected to the first and second boost capacitors.

In other words, the objects of the invention are achieved by a charge pump of the type mentioned in the introduction which is distinguished in particular by the fact that the power transistor has a freely connectable bulk terminal, with which a well structure of the power transistor can be held at a predetermined potential via a well charging path that is substantially separate from the power path.

In accordance with an added feature of the invention, first and second control transistors are connected to be acted upon by the first and second boost capacitors and forming a control circuit driving the power transistor.

In accordance with an additional feature of the invention, there is provided a device for generating the clock signals for driving the boost capacitors and the pump capacitors, and wherein, in order to switch off the charge pump, the clock signals at the boost capacitors initially remain activated for removing charges stored in the charge pump.

In accordance with another feature of the invention, the power transistor is an NMOS transistor formed as a triple well transistor with a first n-type well and a second p-type well in the first well, and the bulk terminal is connected to a p+-doped region in the second well.

In accordance with a concomitant feature of the invention, the power transistor is a PMOS transistor with an n-type well, and the bulk terminal is connected to at least one n+-doped region in the well.

Accordingly, in order to generate the predetermined potential, a first and a second charging transistor are switched into the charging path. In this case, the charging transistors are connected in series, their junction point being connected to the bulk terminal of the power transistor and the outer terminals of the series circuit being connected in parallel with the outputs of the power transistor. Furthermore, the control terminal of the first and second charging transistors is in each case connected to a first or second boost capacitor, at each of which clock signals for controlling the charge pump are present.

Other features which are considered as characteristic for the invention are set forth in the appended claims.

Although the invention is illustrated and described herein as embodied in a charge pump for generating high voltages for semiconductor circuits, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
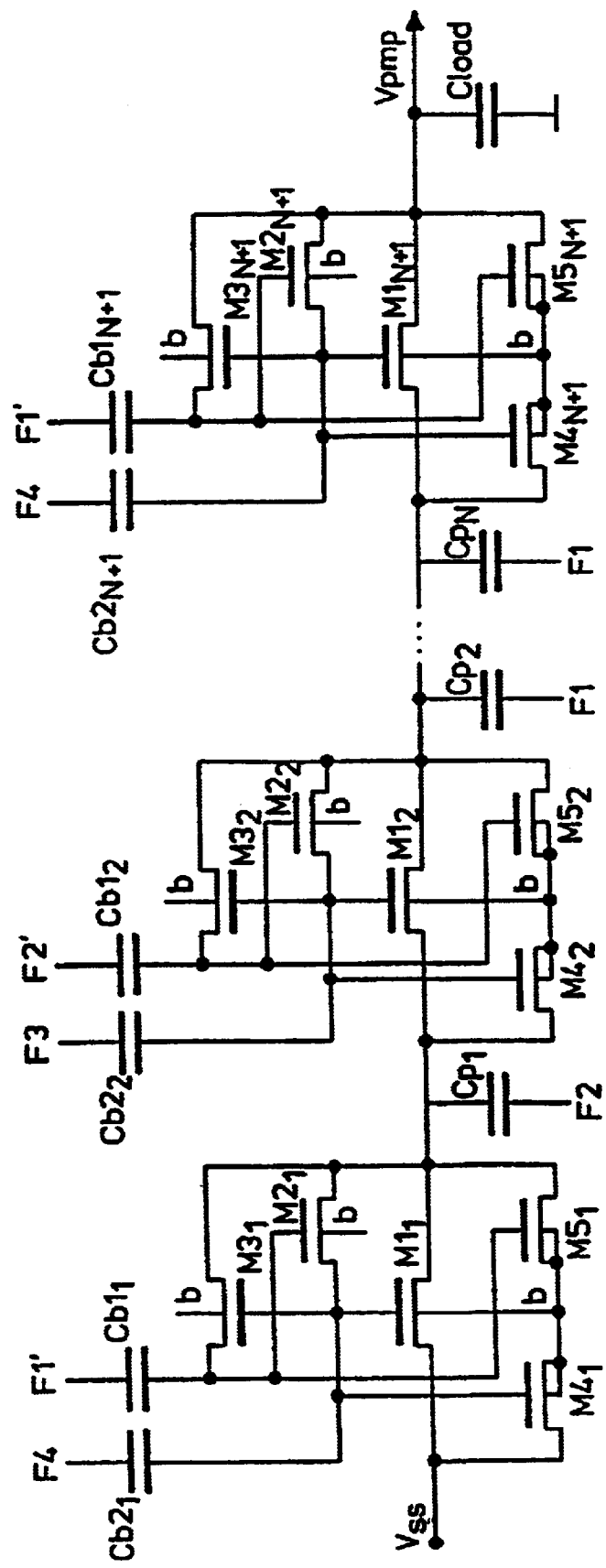
FIG. 1 is a basic circuit diagram of such an embodiment.

Referring now to the figures of the drawing in detail and first, particularly, to FIG. 1 thereof, there is shown a basic circuit diagram of a charge pump according to the invention for negative output voltages, which has a first, a second, if appropriate further, and also a last pump stage. A supply voltage Vdd is present at the input of the circuit, from which supply voltage the pump voltage Vpmp is generated by the N+1 pump stages at the output of the charge pump, which pump voltage charges a charging capacitor Cload. Between two pump stages, a respective pump capacitor Cpx is connected to the charging path, to which corresponding pump clock signals F1, F2 are applied.

Figure 5:
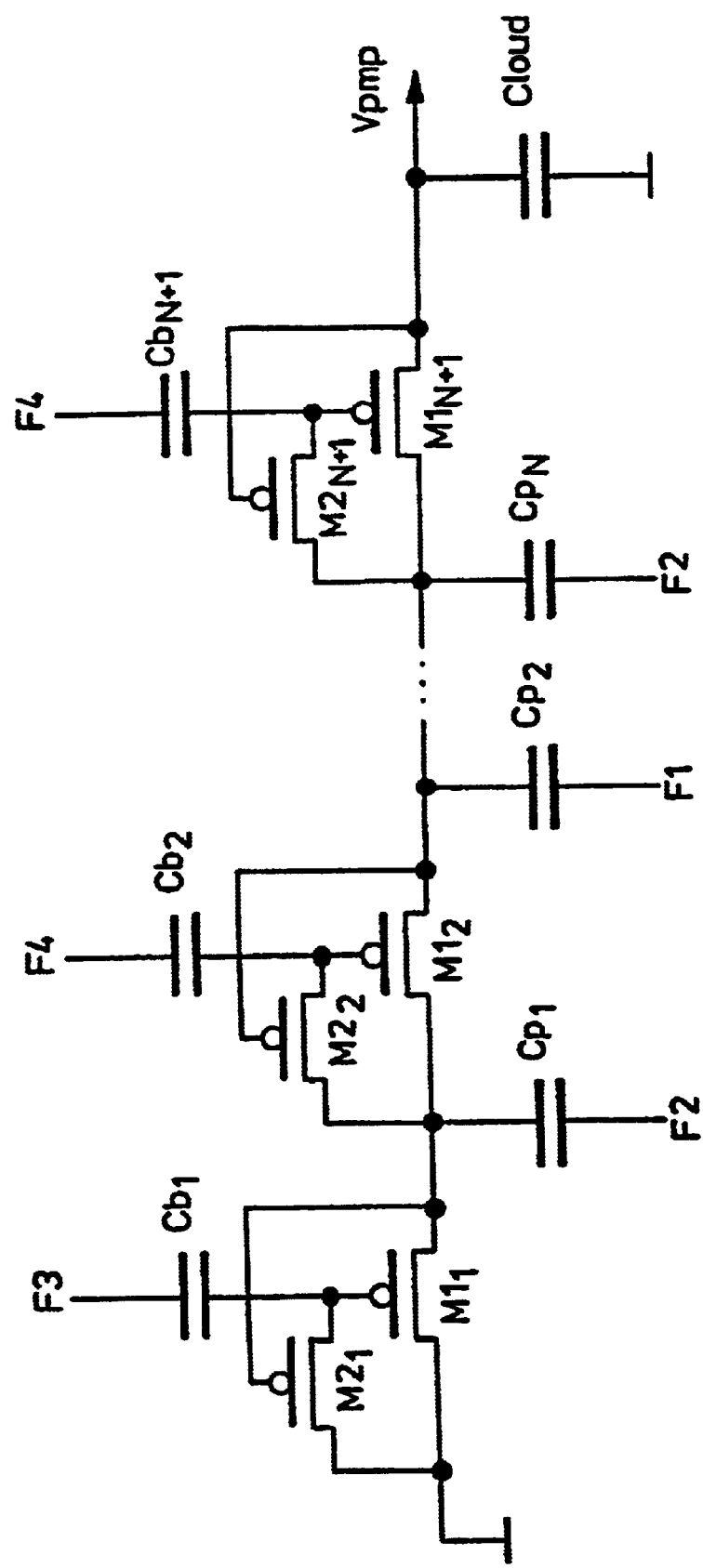
FIG. 5 is a circuit diagram of a first prior art circuit of a charge pump.
Figure 7:
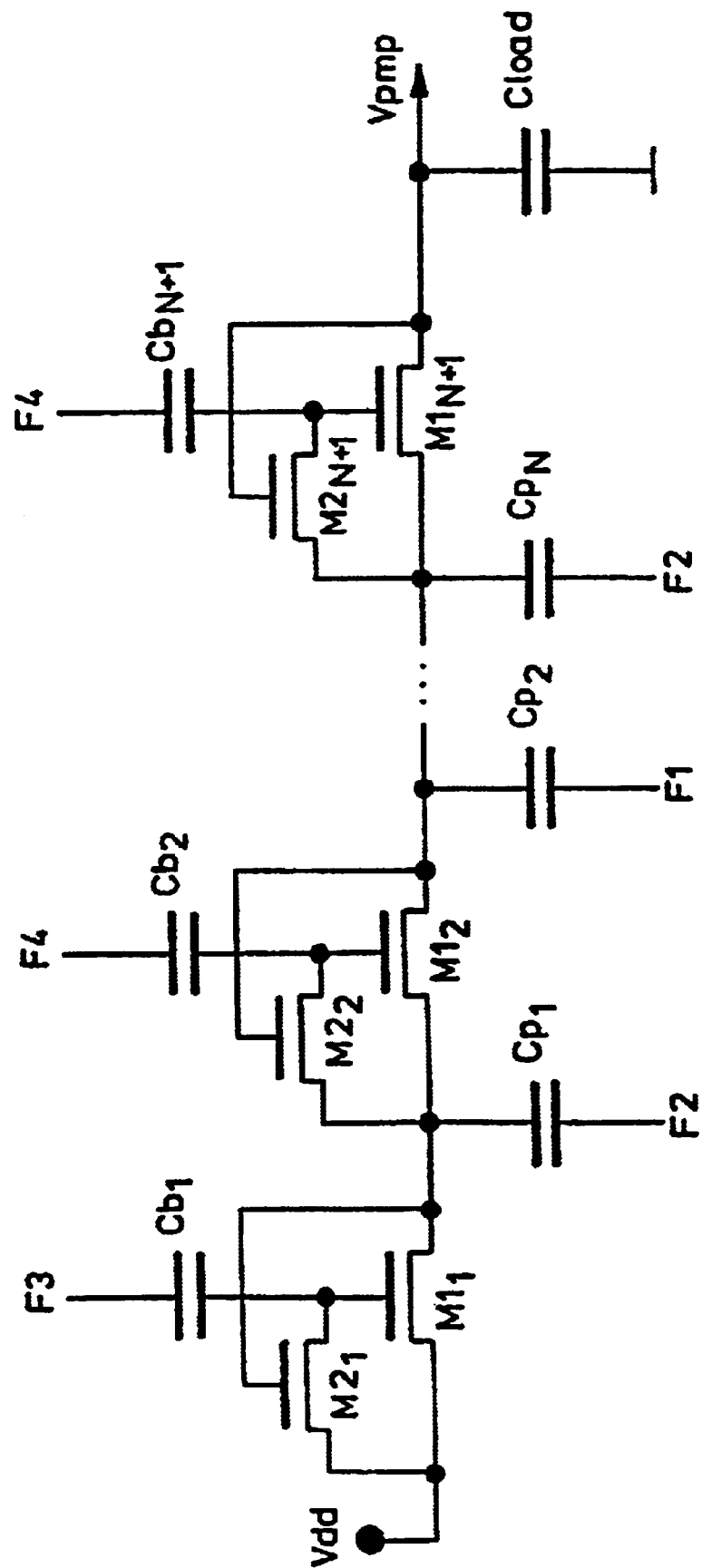
FIG. 7 is a circuit diagram of a second prior art circuit of a charge pump.

An essential difference from the prior art circuit in accordance with FIG. 5 is that, by virtue of the special connections of the transistors in each pump stage x, the power path running via a power transistor M1x in each pump stage is separate from the driving by a first and a second control transistor M2x, M3x. Furthermore, the power path is also separate from a well charging path which runs via a first and a second well charging transistor M4x, M5x.

In detail, each pump stage x has the power transistor M1x connected serially into the charging path. Furthermore, a first and a second boost capacitor Cb1x, Cb2x are provided, at whose first terminals boost clock signals F1', F4; F2', F3 are present. The second terminal of the first boost capacitor Cb1x is connected to a control input of the first control transistor M2x, a first output of the second control transistor M3x, and a control input of the second charging transistor M5x. The second terminal of the second boost capacitor Cb2x is connected to control inputs of the second control transistor M3x, of the power transistor M1x and of the first charging transistor M4x, and also to a first output of the first control transistor M2x. The outputs of the first and second charging transistors M4x, M5x are connected in series, the outer terminals of the series circuit being connected in parallel with the outputs of the power transistor M1x. The bulk terminals B of the first and second charging transistors M4x, M5x and of the power transistor M1x are connected to the junction point of the series circuit of the charging transistors. Finally, the pump capacitor Cpx is connected by its second terminal to the output-side charging path of the respective pump stage x.

Figure 3:
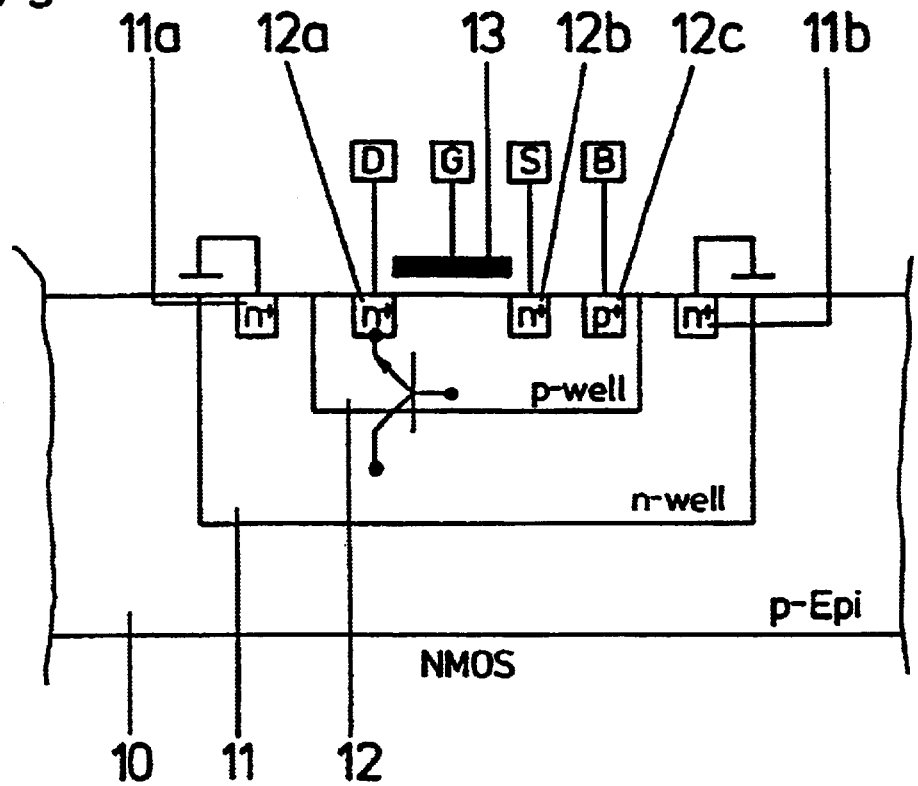
FIG. 3 is a schematic side view of the structural design of a first transistor for the circuit according to FIG. 1.
Figure 4:
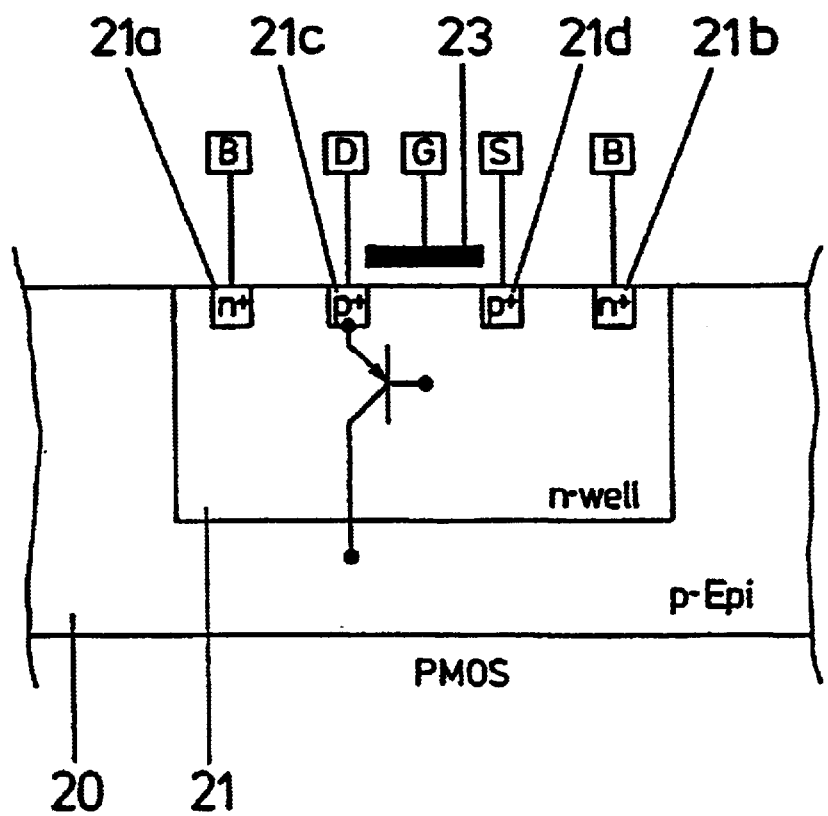
FIG. 4 is a schematic side view of the structural design of a second transistor for the circuit according to FIG. 1.

A structure of one of the transistors used in this charge pump, which is provided for generating negative output voltages, is shown in FIG. 3. It is an NMOS transistor with a freely connectable bulk terminal B. FIG. 4 shows the corresponding structure of a PMOS transistor for a charge pump for generating positive output voltages.

In accordance with FIG. 3, the NMOS transistor must be fabricated as a so-called triple well transistor in an n-type well process. The structure thus comprises, in a p-type epitaxial layer 10 (p-type substrate), a first n-type well 11, into which a second p-type well 12 is introduced. A gate electrode 13 is arranged above the second p-type well 12 in a known manner. First, n+-doped regions (n+-type junctions) 11a, 11b, which are connected to ground, are disposed in the first n-type well 11. Situated in the second p-type well 12 is a second, n+-doped region 12a (n+type junction) for the drain terminal D, and also a third, n+-doped region 12b (n+-type junction) for the source terminal S of the NMOS transistor. The gate electrode 13 is connected to the gate terminal G of the NMOS transistor, while the bulk terminal B is present at a fourth, p+-doped region 12c (p+-type junction) in the second p-type well 12. Finally, this figure also depicts the "problem element", namely the npn transistor between the n+-type junction 12a, the second p-type well 12 and the first n-type well 11. In accordance with FIG. 4, the PMOS transistor comprises an n-type well 21 introduced into a p-type epitaxial layer 20 (p-type substrate), a gate electrode 23 being arranged above said well in a known manner. Situated in the n-type well 21 are first, n+-doped regions 21a, 21b, which form the bulk terminal B of the PMOS transistor. Furthermore, a second and a third, respectively p+-doped region 21c, 21d are provided which represent the drain and source terminals D, S, respectively, of the transistor, while the gate terminal G is present at the gate electrode 23. This figure also depicts the "problem element", namely the pnp transistor between the p+-type junction 21c, the n-type well 21 and the p-type epitaxial layer 20.

Since the p-type substrates 10, 20 must be kept at a voltage Vss (at 0 volts) on account of the abovementioned "problem elements" the following operating conditions result for the transistors:

Vpwell−Vdnpn<=Vjunction, where Vdnpn is the base threshold voltage of the npn transistor; and Vnwell+Vdpnp>=Vjunction, where Vdpnp is the base threshold voltage of the pnp transistor.

By virtue of the connections according to the invention, as shown in FIG. 1, of the transistors in each pump stage, that is to say the separation of the power path from the driving and also the well charging path, it is possible, even in the case of an extremely small voltage difference across the power transistor M1x, to switch the gate of this transistor and also the well charging transistors M4x, M5x, with the voltage swing defined by the first and second control transistors M2x, M3x and the first and second boost capacitors Cb1x, Cb2x. This ensures that the above-mentioned operating conditions for the npn transistor—or for the pnp transistor in the case of a circuit for positive output voltages—are complied with in every state. This is achieved in that the n-type well 11, 21 is always charged to the respective lowest potential present at the n+-type junctions, before a base-emitter voltage which is greater than the supply voltage Vdd is applied to the npn transistor (or pnp transistor).

Figure 2:
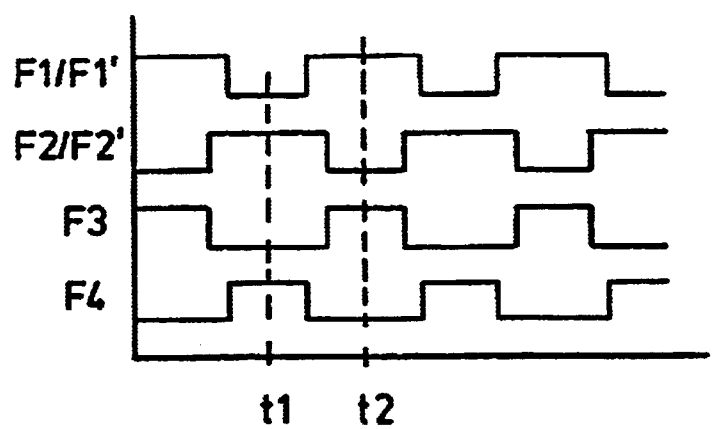
FIG. 2 is a timing diagram for the driving of the charge pump in accordance with FIG. 1.
Figure 6:
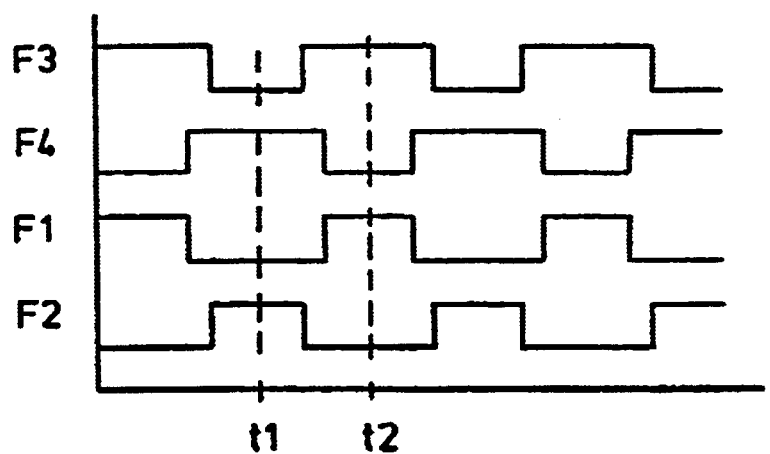
FIG. 6 is a timing diagram for the driving of the circuit in accordance with FIG. 5.
Figure 8:
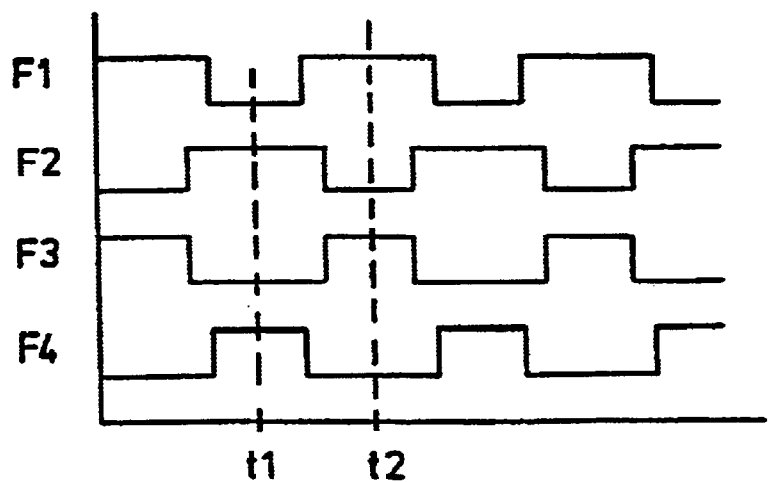
FIG. 8 shows a timing diagram for the driving of the circuit in accordance with FIG. 7.

The timing scheme for the driving of the boost capacitors Cb1x, Cb2x with the clock signals F1', F2', F3, F4 and of the pump capacitors Cpx with the clock signals F1, F2 is shown in FIG. 2. The designations on the clock signals again correspond in each case to the designations of the free terminals of the boost and pump capacitors in FIG. 1. By way of example, the states of the transistors for two instants t1 and t2 (see FIG. 2) shall be explained, the assumption being that the charge pump comprises the three stages shown in FIG. 1 (N=2). In this case, it can be assumed that a high voltage level (predetermined threshold voltage) of a clock signal corresponds approximately to the supply voltage Vdd and a low voltage level essentially constitutes ground potential.

During a first instant t1, the low voltage level is present at the first boost capacitor Cb11 of the first stage, the second boost capacitor Cb22 of the second stage, the first boost capacitor Cb13 of the third stage and also the second pump capacitor Cp2 (the capacitor CpN in FIG. 1 constitutes said second pump capacitor Cp2 in the case of a three-stage charge pump). The high voltage level is applied to the second boost capacitor Cb21 of the first stage, the first boost capacitor Cb12 of the second stage, the second boost capacitor Cb23 of the third stage and also the first pump capacitor Cp1.

During a second instant t2 the level conditions are reversed, in other words the height voltage level is in each case present at the first boost capacitor Cb11 of the first stage, the second boost capacitor Cb22 of the second stage, the first boost capacitor Cb13 of the third stage and also the second pump capacitor Cp2. Correspondingly, the second boost capacitor Cb21 of the first stage, the first boost capacitor Cb12 of the second stage, the second boost capacitor Cb23 of the third stage and also the first pump capacitor Cp1 receive the low voltage level.

The second instant t2 is followed by the level states of the first instant t1 again, so that these alternate in accordance with the illustration in FIG. 2 during the operation of the charge pump. As a result, the power transistors M1x of the charge pump are alternately turned on and turned off and the pump capacitors Cpx are alternately charged and discharged, so that a progressive charge transport is effected from the input of the charge pump to the charging capacitor Cload and the pump voltage Vpmp is correspondingly built up in stages.

If the pump voltage Vpmp at the output of the charge pump is no longer required, then firstly only the clock signals F1, F2 at the pump capacitors Cpx are switched off, while the clock signals F1', F2', F3, F4, at the boost capacitors Cb1x, Cb2x continue to run. As a result, the charges stored in the charge pump and, in particular, in the charging capacitor Cload are progressively pumped back to the voltage source Vss again, and are progressively pumped back to the voltage source Vss again, and additional discharging of the pump voltage (high voltage) at the output of the charge pump is no longer necessary. This has the advantage that the considerable loading caused by this on the transistors used is obviated, so that a significantly higher continuous loading capacity and service life are obtained.

With the circuit according to the invention and the special kind of voltage doubling in each pump stage and also the separation of the power path from the driving, it is possible for the wells of the system to be charged in a defined manner to the respective lowest (when generating a negative voltage) or highest (when generating a positive voltage) potential present, so that the parasitic bipolar transistors present are no longer turned on or are only turned on weekly. As a result, even under extreme conditions (low supply voltage, high temperature), a high voltage limited only by the diode breakdown voltage can become effective and be generated directly on the chip ("on-chip").

Furthermore, the charge pump also solves the second problem mentioned in the introduction, since, by virtue of this way of discharging the charge pump, the charges on the gates of the power transistors M1x are also removed. Consequently, even with a low supply voltage, no short circuit can occur between the input and the output of the pump, so that the latter can be started again without difficulty after an operating intermission.

Figure 9:
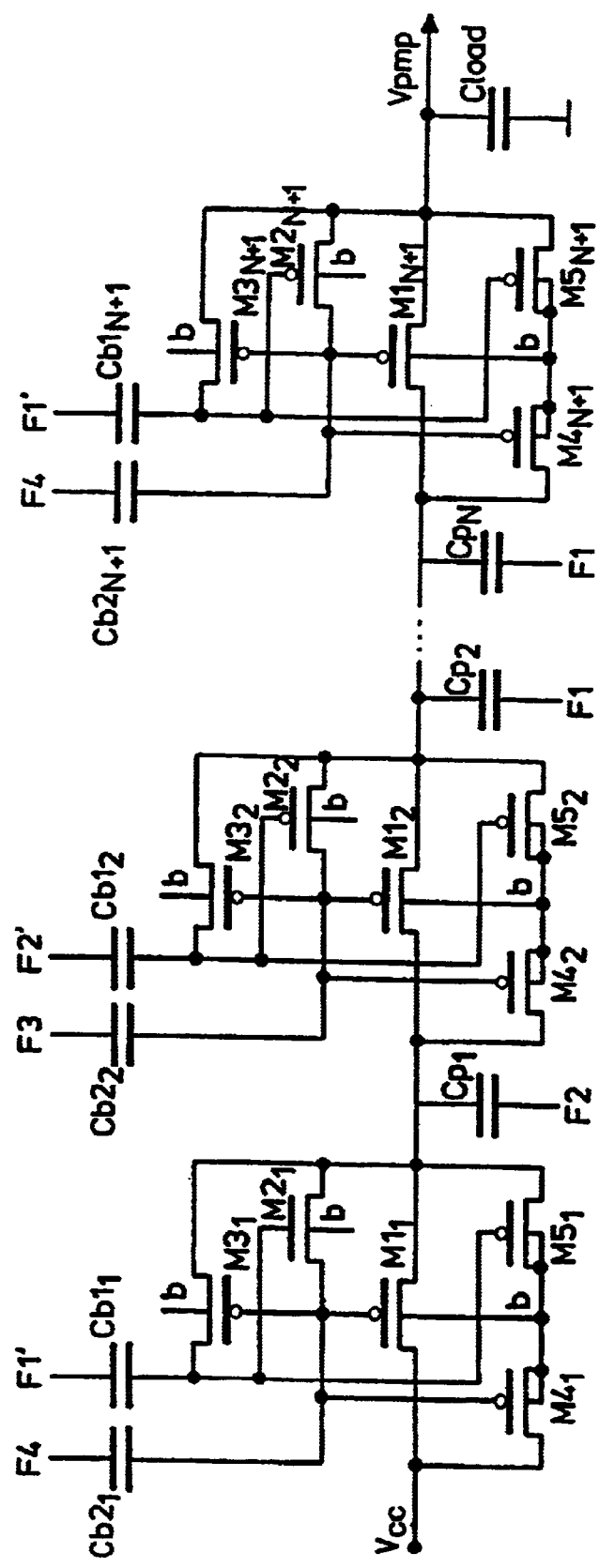
FIG. 9 is a basic circuit diagram of a charge pump constructed with PMOS transistors.

If there is a need to generate positive pump voltages with circuit elements fabricated by means of an n-type well process, but the process steps required by an NMOS triplewell transistor are to be dispensed with and a circuit is to be realized with standard elements, then it is possible to apply the circuit principle according to the invention arbitrarily to a complimentary circuit with respect to FIG. 1 with PMOS transistors and switched n-type well. FIG. 9 shows a circuit constructed complementary to the circuit shown in FIG. 1. This opens up the possibility of using the circuit principle according to the invention in a multiplicity of circuits that are used at the present time.

I claim:

1. A charge pump for generating high voltages for an integrated semiconductor circuit, comprising:

a plurality of pump stages and a plurality of pump capacitors, each one of said pump capacitors configured between a respective set of two of said pump stages;

each of said pump stages having at least one power transistor for generating a pump voltage on a power path thereof, said power transistor having a well structure, a well charging path substantially separate from said power path, and a freely connectable bulk terminal via which said well structure can be held at a predetermined potential through said well charging path;

each said well charging path comprising first and second well charging transistors for generating the predetermined potential;

said well charging transistors forming a series circuit having a node connected to said bulk terminal of said power transistor and connected, at outer terminals, in parallel with said power transistor; and each of said pump stages further having first and second boost capacitors connected to receive clock signals for controlling the charge pump, said first and second well charging transistors each having a control terminal respectively connected directly to said first and second boost capacitors.

2. The charge pump according to claim 1, wherein each of said pump stages further comprises first and second control transistors connected to be acted upon by said first and second boost capacitors and forming a control circuit driving said power transistor.

3. The charge pump according to claim 1, which comprises a device for generating the clock signals for driving said boost capacitors and said pump capacitors, and wherein, in order to switch off the charge pump, the clock signals at said boost capacitors initially remain activated for removing charges stored in said charge pump.

4. The charge pump according to claim 1, wherein each said power transistor is an NMOS transistor formed as a triple well transistor with a first n-type well and a second p-type well in said first well, and said bulk terminal is connected to a p+-doped region in said second well.

5. The charge pump according to claim 1, wherein each said power transistor is a PMOS transistor with an n-type well, and said bulk terminal is connected to at least one n+-doped region in said well.

6. A charge pump for generating high voltages for an integrated semiconductor circuit, comprising:

a plurality of pump stages and a plurality of pump capacitors, each one of said pump capacitors configured between a respective set of two of said pump stages;

each of said pump stages having at least one power transistor for generating a pump voltage on a power path thereof, said power transistor having a well structure, a well charging path substantially separate from said power path, and a freely connectable bulk terminal via which said well structure can be held at a predetermined potential through said well charging path;

each said well charging path comprising first and second well charging transistors for generating the predetermined potential;

said well charging transistors forming a series circuit having a node connected to said bulk terminal of said power transistor and connected, at outer terminals, in parallel with said power transistor; and each of said pump stages further having first and second boost capacitors connected to receive clock signals for controlling the charge pump, said first and second well charging transistors each having a control terminal respectively connected to said first and second boost capacitors;

each of said pump stages further including first and second control transistors connected to be acted upon by said first and second boost capacitors and forming a control circuit driving said power transistor.

* * * * *